(12) United States Patent
Khafizov et al.

(10) Patent No.: US 9,996,370 B1
(45) Date of Patent: Jun. 12, 2018

(54) PAGE SWAPPING IN VIRTUAL MACHINE ENVIRONMENT

(71) Applicant: Open Invention Network LLC, Durham, NC (US)

(72) Inventors: Farid Khafizov, Plano, TX (US); Andrey Mokhov, Moscow (RU)

(73) Assignee: Open Invention Network LLC, Durham, NC (US)

( * ) Notice: Subject to any disclaimer, the term of this patent is extended or adjusted under 35 U.S.C. 154(b) by 282 days.

(21) Appl. No.: 13/860,581

(22) Filed: Apr. 11, 2013

Related U.S. Application Data

(60) Provisional application No. 61/625,765, filed on Apr. 18, 2012.

(51) Int. Cl.
| | | |
|---|---|---|
| G06F 12/00 | (2006.01) | |
| G06F 9/455 | (2018.01) | |
| G06F 9/50 | (2006.01) | |

(52) U.S. Cl.
CPC ...... G06F 9/45533 (2013.01); G06F 9/45558 (2013.01); G06F 9/5077 (2013.01)

(58) Field of Classification Search
CPC . G06F 9/5077; G06F 9/45558; G06F 9/45533
See application file for complete search history.

(56) References Cited

U.S. PATENT DOCUMENTS

| | | | |
|---|---|---|---|
| 7,433,951 B1 * | 10/2008 | Waldspurger | G06F 9/5016 709/223 |
| 7,596,677 B1 * | 9/2009 | Koryakin et al. | 711/206 |
| 7,757,034 B1 * | 7/2010 | Dobrovolskiy et al. | 711/6 |
| 2005/0235123 A1 * | 10/2005 | Zimmer et al. | 711/170 |
| 2009/0006801 A1 * | 1/2009 | Shultz et al. | 711/170 |
| 2009/0307686 A1 * | 12/2009 | Hepkin | G06F 9/45558 718/1 |
| 2010/0023565 A1 * | 1/2010 | Colbert et al. | 707/204 |
| 2010/0299667 A1 * | 11/2010 | Ahmad et al. | 718/1 |
| 2011/0320556 A1 * | 12/2011 | Reuther | G06F 9/4856 709/213 |
| 2012/0036325 A1 * | 2/2012 | Mashtizadeh et al. | 711/118 |
| 2012/0233435 A1 * | 9/2012 | Ben-Yehuda et al. | 711/170 |
| 2013/0290595 A1 * | 10/2013 | Weissman et al. | 711/6 |

OTHER PUBLICATIONS

Govil et.al. "Cellular Disco: resource management using virtual clusters on shared-memory multiprocessors" Dec. 1999 ACM.*

* cited by examiner

Primary Examiner — Tuan Thai
Assistant Examiner — Tasnima Matin
(74) Attorney, Agent, or Firm — Haynes and Boone, LLP

(57) ABSTRACT

Disclosed are examples of memory allocation and reallocation for virtual machines operating in a shared memory configuration creating a swap file for at least one virtual machine. One example method may include allocating guest physical memory to the swap file to permit the at least one virtual machine to access host physical memory previously occupied by the guest physical memory. The example method may also include determining whether an amount of available host physical memory is below a minimum acceptable level threshold, and if so then freeing at least one page of host physical memory and intercepting a memory access attempt performed by the at least one virtual machine and allocating host physical memory to the virtual machine responsive to the memory access attempt.

14 Claims, 10 Drawing Sheets

500

```
#include <stdio.h>
include <unistd.h> /* sysconf(3) */ int main(void) {
        printf("The page size for this system is %ld bytes.\n",
               sysconf(_SC_PAGESIZE)); /* _SC_PAGE_SIZE is OK too. */ return 0;
}
```

FIG. 5

| $T_{tp}$ | Page address | PID | OS |
|---|---|---|---|
| 0 | #0014F144 | 32051 | 1 |
| 0.125 | #0A7D3310 | 4413 | 2 |
| 0.25 | #0F1'A158 | 4413 | 2 |
| 0.5 | #001A133B | 32051 | 2 |
| 0.5 | #0110QAB2 | 4402 | 1 |
| 0.75 | #10A12B45 | 4402 | 1 |
| 1.25 | #0A12D323 | 4413 | 1 |
| ... | #1BC12131 | 4413 | ... |
| ... | #00A3BC77 | 32051 | ... |
| ... | #100BA22D | 4402 | ... |
| ... | #BD19FF41 | 5765 | ... |

PAGE SWAPPING IN VIRTUAL MACHINE ENVIRONMENT

CROSS REFERENCE TO RELATED APPLICATIONS

This application claims priority to U.S. Provisional Patent Application Ser. No. 61/625,765, filed Apr. 18, 2012. The subject matter of which is hereby incorporated by reference in its entirety.

FIELD

The disclosed application relates generally to the field of resource allocation mechanisms within virtual computing system, and more particularly, where the resource is system memory, which must be allocated and deallocated in a desired way among different subsystems or applications that may need to compete for use of the resource.

BACKGROUND

In recent years virtualization has become an important enabling technology and has put significant demand for proper utilization of limited resources of the system hosting multiple virtual machine (VM) clients. In order to increase utilization of resources in a VM environment, an overprovisioning technique is often utilized. For example, a hosting platform with a total of 4 GB of RAM may provide resources for two guest VMs with their respective memory spaces being 3 GB and 2 GB. Thus, a total size of configured RAM (5 GB) may exceed the maximum available physical resource (4 GB).

Several techniques have been proposed to address potential issues related to possible resource conflicts resulting from such memory over-provisioning. One of the known techniques implemented in an ESX platform of VMware is known as memory page swapping, which is performed by a hypervisor which is based on page allocation information that is available at a hypervisor level. In computing systems, a hypervisor may be known as a virtual machine manager (VMM). A hypervisor operates as a computer software program, firmware and/or hardware that creates and runs virtual machines. A computer on which a hypervisor is operating one or more virtual machines is defined as a host machine. Each virtual machine is known as a guest machine. The hypervisor presents the guest operating systems with a virtual operating platform and manages the execution of the guest operating systems. Multiple instances of a variety of operating systems may share the virtualized hardware resources managed by the hypervisor. It has been reported that while this page allocation technique provides some level of optimization to the overcommitted memory configuration, it can result in significant performance penalties to the hosted VM as well as the whole system. Therefore, effective low levels of available memory must be monitored, addressed and reallocated to alleviate a situation resulting from an over-provisioning of resources.

According to conventional approaches, virtualization is an abstraction layer that decouples the physical hardware from the operating system to deliver resource utilization and flexibility. Virtualization allows multiple virtual machines, with heterogeneous operating systems (e.g., Windows XP, Linux, Free BSD, etc.) and applications to operate in isolation, side-by-side on the same physical machine. A virtual machine is the representation of a physical machine by software. It has its own set of virtual hardware (e.g., RAM, CPU, NIC, hard disks, etc.) upon which an operating system and applications are loaded. The operating system may experience a consistent, normalized set of hardware regardless of the actual physical hardware components.

There are at least two architectures 100 for VM realizations in FIG. 1. One example is a hosted architecture 110 illustrated in FIG. 1 which operates by having virtualization software layer 114 installed as an application onto a pre-existing host OS 112. In this case, the virtualization layer 114 relies on the host operating system 112 for device support and physical resource management. VMware Server, VMware Workstation, and Microsoft Virtual PC are examples of a hosted architecture.

Another example is a native hypervisor architecture 120 also illustrated in FIG. 1. In this example, there is no pre-existing OS. In this case, a hypervisor or virtual machine manager (VMM), operates directly on the host's hardware, controls the hardware, and manages guest operating systems. It is named "Hypervisor" because it is conceptually one level higher than a supervisory program. The hypervisor presents to the guest operating systems 122 a virtual operating platform 124 and manages the execution of the guest operating systems 122. The virtualization software 124 is installed on a clean system, and it provides kernel and driver support for the raw physical hardware. The VMware ESX server is an example of virtualization utilizing hypervisor type architecture.

Each of the conventional architectures has pros and cons. For example, the hosted architecture 110 relies on the underlying OS for hardware support, and therefore can support more hardware at a lower cost. However there is a significant overhead due to the resources needed by the hosting OS. The native hypervisor architecture 120 requires significantly less resources and therefore is preferred when high performance is a key requirement for a VM system.

Within an operating system, each application operates as though it has access to all of physical memory the operating system offers. Since multiple programs operate at the same time, each process cannot own and/or occupy all of the memory available. Instead processes are using virtual memory. In a virtual memory system, all of the addresses are virtual addresses and are not physical addresses. For example, a program may be accessing data in memory address 629, but the virtual memory system doesn't have data stored in RAM location 629. In fact, it may not even be in the RAM, since it could have been moved to the disk, and the program is accessing the virtual addresses. These virtual addresses are converted into physical addresses by the processor based on information held in a set of tables maintained by the operating system.

The operating system maintains a table of virtual address-to-physical address translations so that the computer hardware can respond properly to address requests. If the address is on disk instead of in RAM, the operating system will swap memory, i.e., temporarily halt the process, unload other memory to disk, load in the requested memory from disk, and restart the process. This way, each process gets its own address space to operate within and can access more memory than is physically installed.

To make the address translation easier, virtual and physical memory are divided into handy sized chunks called pages. These pages are all the same size, they need not be but if they were not, the system would be very hard to administer. LINUX on Alpha A×P systems uses 8 Kbyte pages and on INTEL x86 systems it uses 4 Kbyte pages. Each of these pages is given a unique number: the page frame number (PFN). The pages of virtual memory do not have to be present in physical memory in any particular order.

In the paged model, a virtual address is composed of two parts: an offset and a virtual page frame number. If the page size is 4 Kbytes, bits 11:0 of the virtual address contain the offset and bits 12 and above are the virtual page frame number. Each time the processor encounters a virtual address it must extract the offset and the virtual page frame number. The processor must translate the virtual page frame number into a physical one and then access the location at the correct offset into that physical page and to do this the processor uses page tables.

FIG. 2 illustrates the virtual address spaces 200 of two processes, process X 210 and process Y 250, each with their own page tables 220 and 240, respectively. These page tables process virtual pages into physical pages in memory. This illustrates that process X's virtual page frame number 0 is mapped into memory in physical page frame number 1 and that process Y's virtual page frame number 1 is mapped into physical page frame number 4 of the physical memory 230. Each entry in the theoretical page table contains the following information: (a) valid flag, which indicates if this page table entry is valid, (b) the physical page frame number that this entry is describing, and (c) access control information, which describes how the page may be used.

To translate a virtual address into a physical one, the processor must first work out the virtual addresses page frame number and the offset within that virtual page. By making the page size a power of 2 this can be easily done by masking and shifting. The processor uses the virtual page frame number as an index into the processes page table to retrieve its page table entry. If the page table entry at that offset is valid, the processor takes the physical page frame number from this entry. If the entry is invalid, the process has accessed a non-existent area of its virtual memory. In this case, the processor cannot resolve the address and must pass control to the operating system so other resolutions may be explored.

The processor notifies the operating system that the correct process has attempted to access a virtual address for which there is no valid translation based on the processor type. The processor delivers the information, by a page fault and the operating system is notified of the faulting virtual address and the reason for the page fault.

Swapping out memory pages occurs when memory resources become limited. Traditionally, this is a task performed by a memory resource manager residing inside the kernel of each OS. In case of multiple VMs sharing a single pool of hardware resources, it may be possible to increase the effectiveness of utilization of those resources by adding additional software functionality into a sub-system of the VM, such as a hypervisor, that could monitor data available to all VM clients.

An application begins and uses the interfaces provided by the operating system to explicitly allocate or deallocate the virtual memory during the execution. In a non-virtual environment, the operating system assumes it owns all physical memory in the system. The hardware does not provide interfaces for the operating system to explicitly "allocate" or "free" physical memory. Different operating systems have different implementations to realize this abstraction. One example is that the operating system maintains an "allocated" list and a "free" list, so whether or not a physical page is free depends on which list the page is currently residing.

Because a virtual machine operates an operating system and several applications, the virtual machine memory management properties combine both application and operating system memory management properties. Like an application, when a virtual machine first starts, it has no pre-allocated physical memory. The virtual machine cannot explicitly allocate host physical memory through any standard interfaces. The hypervisor creates the definitions of "allocated" and "free" host memory in its own data structures. The hypervisor intercepts the virtual machine's memory accesses and allocates host physical memory for the virtual machine on its first access to the memory. In order to avoid information leaking among virtual machines, the hypervisor always writes zeroes to the host physical memory before assigning it to a virtual machine.

Virtual machine memory deallocation operates like an operating system, such that the guest operating system frees a piece of physical memory by adding these memory page numbers to the guest free list, but the data of the "freed" memory may not be modified at all. As a result, when a particular portion of guest physical memory is freed, the mapped host physical memory will usually not change its state and only the guest free list will be changed.

In order to increase memory usage utilization, ESX supports memory over-commitment which is when the total amount of guest physical memory of the running virtual machines is larger than the amount of actual host memory. To effectively support memory over-commitment, the hypervisor provides host memory reclamation techniques. These techniques are transparent page sharing, ballooning, and host swapping. Page sharing is a well-known technique where the OS identifies identical memory pages and provides mechanisms for applications to share the identical pages thus making page duplication unnecessary.

Ballooning makes the guest operating system aware of the low memory status of the host. VMware White Paper "Understanding Memory Resource Management in VMware® ESX™ Server" describes the process of the balloon inflating. In ESX, a balloon driver is loaded into the guest operating system as a pseudo-device driver. It has no external interfaces to the guest operating system and communicates with the hypervisor through a private channel. The balloon driver polls the hypervisor to obtain a target balloon size. If the hypervisor needs to reclaim virtual machine memory, it sets a proper target balloon size for the balloon driver, making it "inflate" by allocating guest physical pages within the virtual machine.

For ballooning to work as intended, the guest operating system must install and enable the balloon driver. The guest operating system must have sufficient virtual swap space configured for guest paging to be possible. Ballooning might not reclaim memory quickly enough to satisfy host memory demands. In addition, the upper bound of the target balloon size may be imposed by various guest operating system limitations.

Another known issue is the double paging problem. Assuming the hypervisor swaps out a guest physical page, it is possible that the guest operating system pages out the same physical page, if the guest is also under memory pressure. This causes the page to be swapped in from the hypervisor swap device and immediately to be paged out to the virtual machine's virtual swap device.

Each of the methods described above have their drawbacks. Page sharing and ballooning are known to be slow in addressing the problem, and the existing hypervisor swapping method utilized by VMware often causes performance problems explained in previous paragraphs. Therefore an alternative and more efficient method is needed to mitigate low memory problem resulting from over provisioning effects in the VM environment.

SUMMARY OF THE INVENTION

Example embodiments of the present invention may include a method that provides creating, via a processor, a swap file for at least one virtual machine, allocating guest physical memory to the swap file to permit the at least one virtual machine to access host physical memory previously occupied by the guest physical memory, determining whether an amount of available host physical memory is below a minimum acceptable level threshold, and if so then freeing at least one page of host physical memory, and intercepting a memory access attempt performed by the at least one virtual machine and allocating host physical memory to the virtual machine responsive to the memory access attempt.

Another example embodiment may include an apparatus that provides a processor configured to create a swap file for at least one virtual machine, allocate guest physical memory to the swap file to permit the at least one virtual machine to access host physical memory previously occupied by the guest physical memory, determine whether an amount of available host physical memory is below a minimum acceptable level threshold, and if so then freeing at least one page of host physical memory, and intercept a memory access attempt performed by the at least one virtual machine and allocate host physical memory to the virtual machine responsive to the memory access attempt, and a memory configured to be allocated to provide the guest physical memory and the host physical memory.

BRIEF DESCRIPTION OF THE DRAWINGS

FIG. 5 is an illustration of code that can be used to retrieve a page size for a guest OS.

FIG. 7 is an example illustrating memory pages ordered according to their normalized usage metric.

DETAILED DESCRIPTION OF THE EMBODIMENTS

Figure 1:
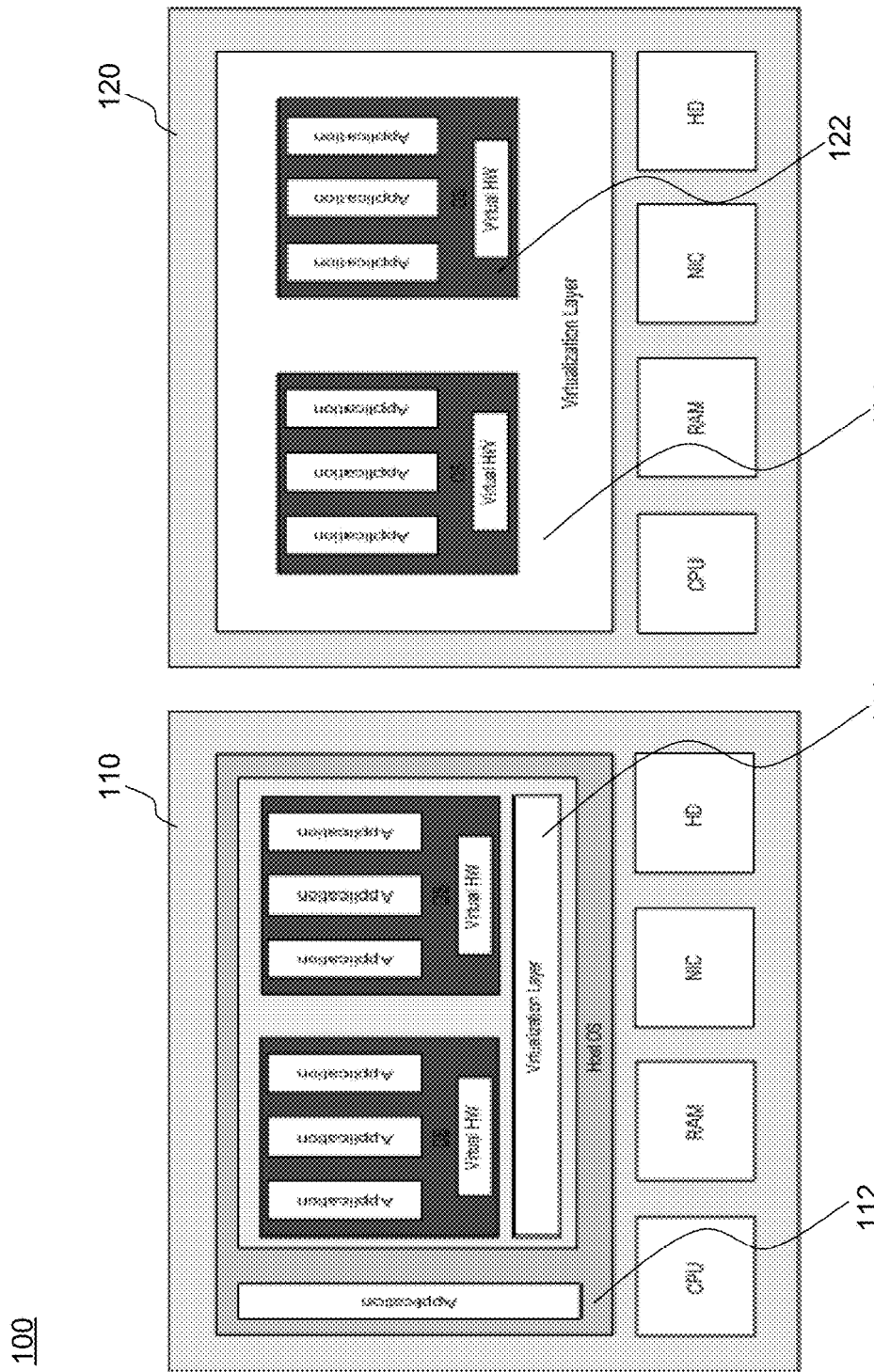
FIG. 1 is a PRIOR ART hosted VM architecture (on the left) vs native hypervisor VM architecture (on the right).
Figure 2:
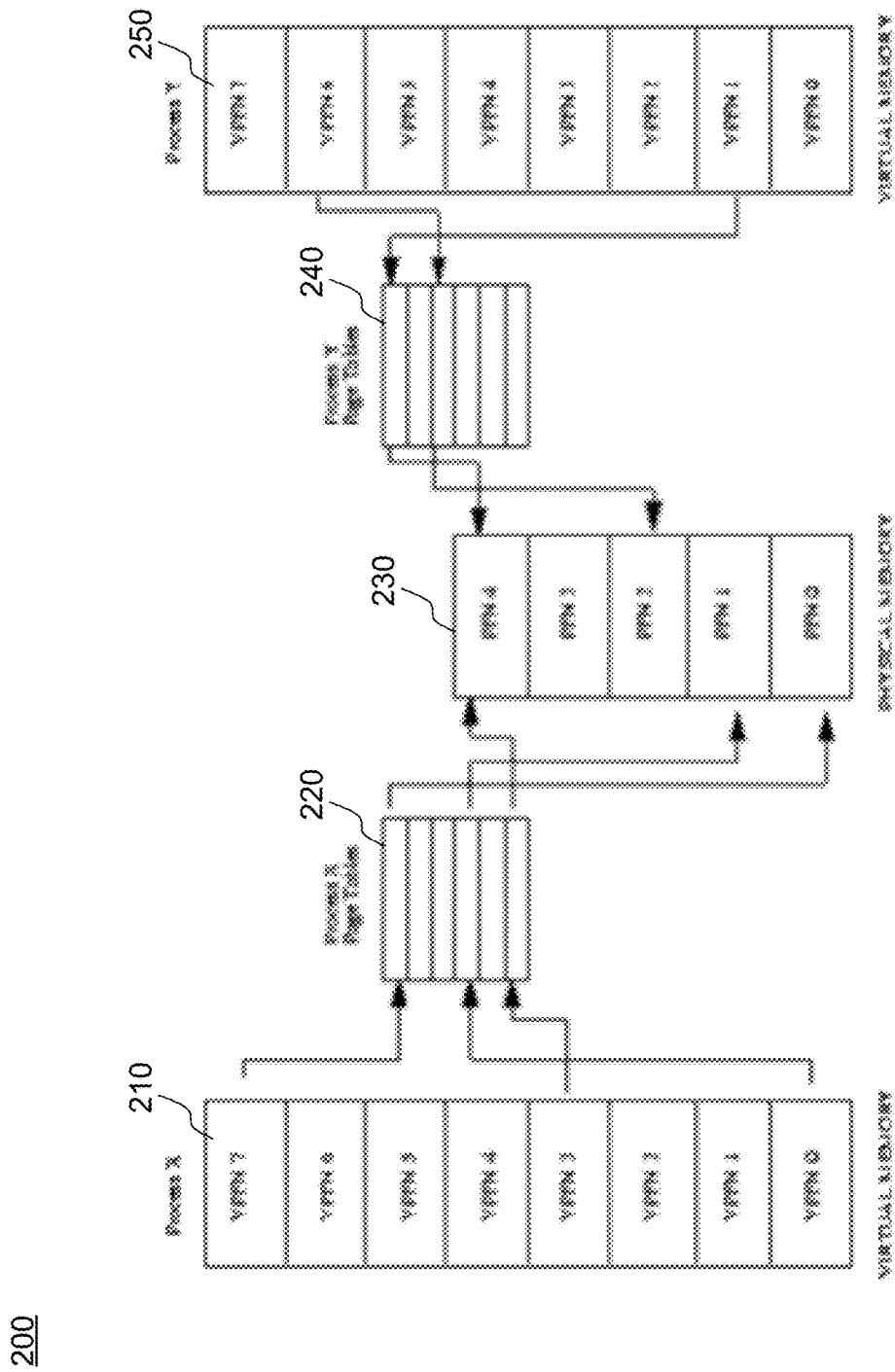
FIG. 2 is a PRIOR ART illustration that shows the virtual address spaces of two processes, process X and process Y, each with their own page tables.

In what follows we utilize the following terminology and notation, "host physical memory" (HPM) is the memory visible to the hypervisor as available on the system; guest physical memory (GPM) is the memory visible to the guest OS running on the VM, guest virtual memory (GVM) is a continuous virtual address space presented by the guest OS to its applications. The memory transfer between the GPM and the guest swap device is referred to as guest level paging (GLP) and is driven by the guest OS. The memory transfer between the GPM and host swap device is referred to as hypervisor swapping and is driven by hypervisor. $M_X$ denotes total size of memory of type X. $F_X$ denotes a fraction of free memory X, e.g., $F_{HPM}$ is a percentage of free host physical memory. $T_X$ denotes the minimum acceptable level of free memory X, e.g., condition $F_{HPM} < T_{HPM}$ means that the free host physical memory has fallen below a predefined acceptable level (i.e., threshold).

To manage excessively overcommitted physical memory, the hypervisor could also swap the virtual machine's memory. To support this, when starting a virtual machine, the hypervisor creates a separate swap file for the virtual machine. Then, if necessary, the hypervisor can directly swap out guest physical memory to the swap file, which frees host physical memory for other virtual machines. However, there could be significant performance penalties. In current VMware ESX implementations, the hypervisor has no knowledge about which guest physical pages should be swapped out, and the swapping may cause unintended interactions with the native memory management policies in the guest OS. For example, the guest OS will never page out its kernel pages. The hypervisor, on the other hand, may swap them out. In addition, the guest operating system reclaims the clean buffer pages by dropping them, but, the hypervisor could unnecessarily swap them out in order to reclaim the mapped host physical memory.

Example embodiments provide for swapping memory pages at a VM manager level. To illustrate an example it is assumed that the system has a native (bare) hypervisor architecture and hosts two operating systems: OS1 (e.g., LINUX on INTEL x86) and OS2 (e.g., LINUX on ALPHA AXP). It should be noted that the number of hosted OSs, their specific names and types as well as the architecture of the VM system are not specific to the example embodiments. Any person experienced or having skill in the art will appreciate that the examples provided herein can be extended to any number of guest OSs of various types (e.g., Free BSD, WINDOWS, SOLARIS, MAC OSX, etc.) with proper adjustment of specific implementation details of guest OSs.

Similar to the ESX platform, when starting a virtual machine the hypervisor creates a separate swap file for the virtual machine. If necessary, the hypervisor can directly swap out guest physical memory to the swap file, which frees host physical memory for other VMs. The hypervisor creates the definitions of "allocated" and "free" host memory in its own data structures. The hypervisor intercepts the virtual machine's memory accesses and allocates host physical memory for the virtual machine on its first access to the memory.

Figure 3:
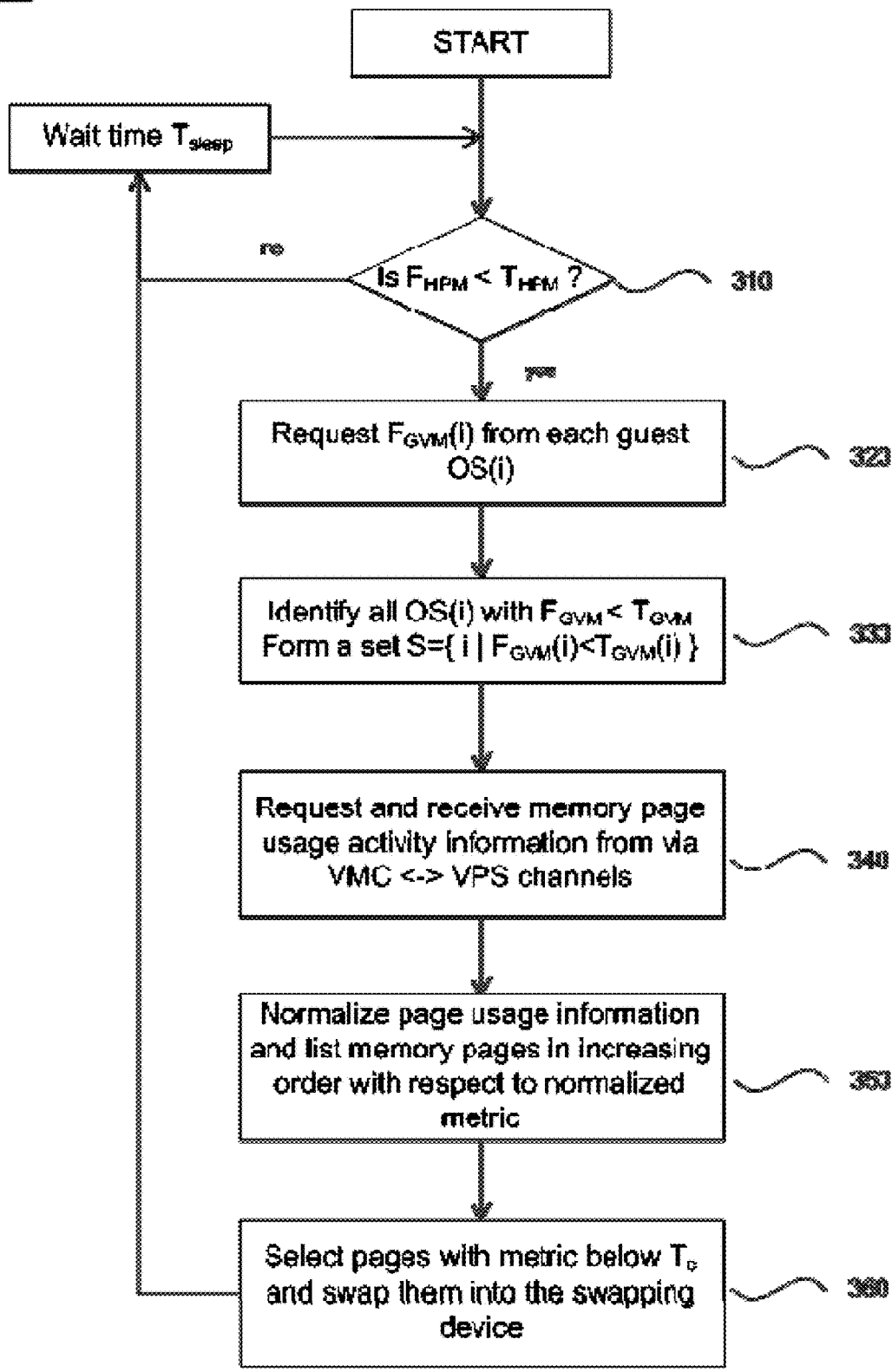
FIG. 3 is a flow chart illustrating a main hypervisor swapping loop.

It may be optimal to maintain free pages of host memory (HPM) above a predefined threshold ($T_{HPM}$). The general flow of an example embodiment of managing memory allocation is illustrated in FIG. 3 and includes various operations of a hypervisor and its corresponding swapping loop. In operation 310, the hypervisor checks if free host memory (HPM) is below a minimum acceptable level $T_{HPM}$. If no, the hypervisor will re-check this condition after a period of time $T_{sleep}$, otherwise the following actions will be performed as described in detail below. In operations 320 and 330, the hypervisor retrieves free GVM levels for each client OS and identifies those clients where $F_{GVM}$ has fallen below acceptable levels from the hypervisor's measuring criteria. Next at operation 340, for those guest OSs where the available guest virtual memory has fallen below a predefined acceptable level, additional page usage information may be retrieved. That information is normalized in operation 350 and the page usage information and list memory pages are listed in an increasing order with respect to the normalized metric, and based on the normalized information pages for swapping the pages are selected with a metric below a threshold level and are swapped into the swapping device.

Figure 4:
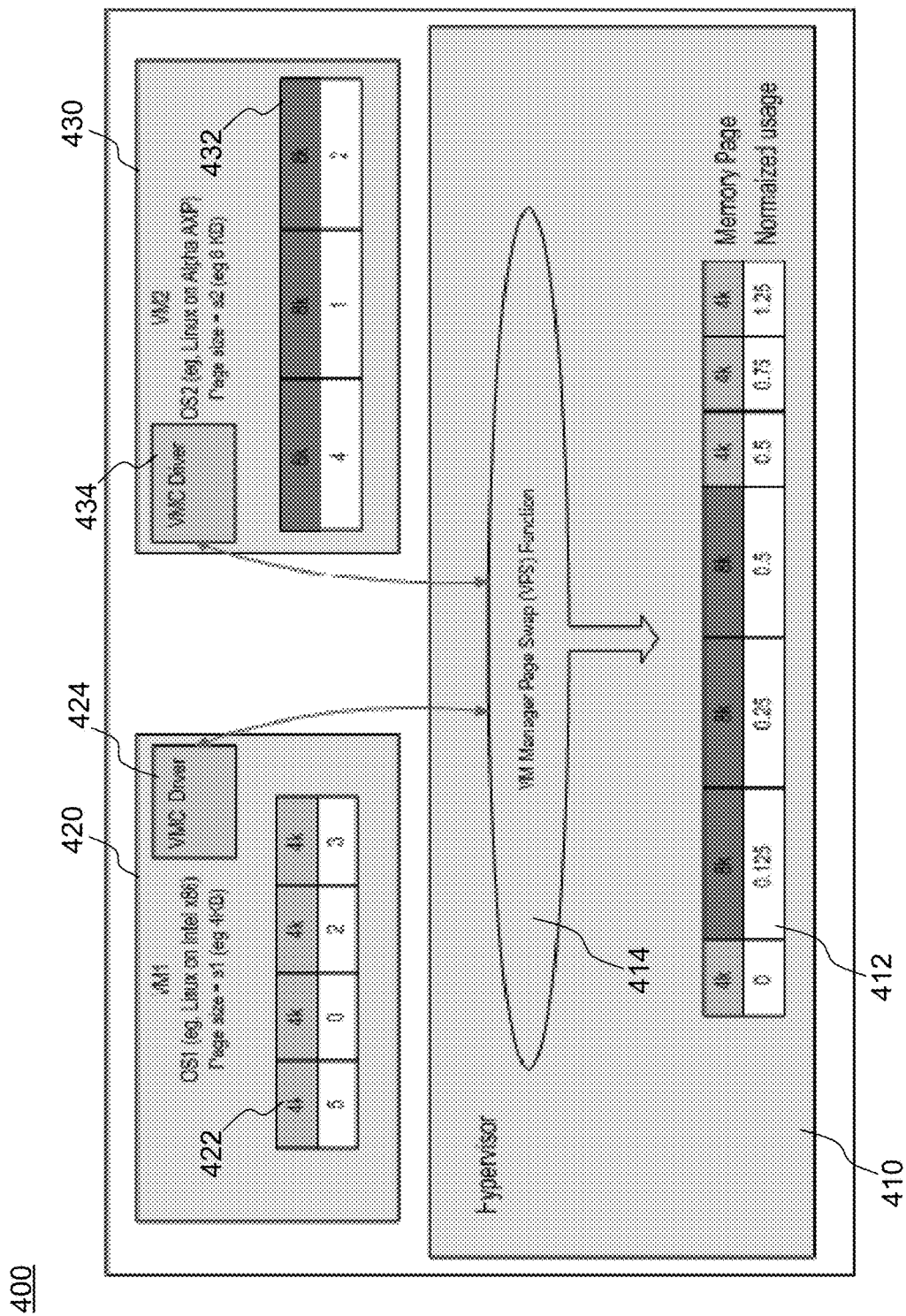
FIG. 4 is a hypervisor page swap configuration and its connection to page status data in each guest OS via VM manager connection driver.

FIG. 4 illustrates a hypervisor page swap driver and its connection to page status data in each guest OS as provided by a VM manager connection driver 400. Referring to FIG. 4, the system 400 has a VM manager page swap (VPS) function 414 which resides in the VM manager layer (e.g., inside the hypervisor 410) and a VM manager communication (VMC) driver 424 and 434 installed with each guest OS of the VMs 420 and 430. Each VMC driver 424/434 collects information of memory pages in use and passes that information to the VPS function 414. Depending on the operating systems, the information that can be passed by a VMC driver 424/434 to the VPS may include but is not limited to the number of free pages as observed by the guest OS, page size and age for each allocated memory page, etc. Some or all of that information is used by the VPS 414 to decide which memory pages should be swapped out. The methods of retrieving such information vary for different OSs. In this example, the page sizes of the LINUX on INTEL are all 4 KB as observed from the table 422, and the size of the pages in the LINUX on ALPHA AXP platforms is 8 KB as observed from table 432. The memory pages of both VMs are combined into a single table with corresponding normalized usage figures 412.

In order to simplify the illustration of the method it should be assumed that each OS has a fixed memory page size. Page sizes may differ even for the same OS. For example, LINUX on an ALPHA AxP system has a page size of 8 KB, while Linux on INTEL-x86 systems utilizes 4 KB pages. Most operating systems allow programs to discover the page size at runtime through OS specific system calls. For example, in LINUX (or any POSIX-based systems) a simple command 'getconf PAGESIZE' will return a memory page size in Bytes. Alternatively, a system function 'sysconf( )' can be used within applications, as illustrated in the diagram 500 of FIG. 5 which is written in the 'C' programming language.

To elaborate on some of the operations of the main hypervisor swapping loop, an example may be considered for explanation purposes. Assume the system with the hypervisor architecture has $M_{HPM}=2$ GB of RAM with two guest OSs: OS1 and OS2. Assume $T_{HPM}=10\%$ and each OS is allocated $M_{GVM}=1.5$ GB. From the hypervisor's point of view as long as HPM free memory $F_{HPM}$ is above 10% which is =200 MB, no hypervisor level swapping is required. However, if $F_{HPM}$ drops below 10%, the hypervisor knows that one or both OSs contribute to the reduction of the free HPM, and it will initiate a swapping operation. As stated in operation 320, the hypervisor requests from each guest OS its free guest virtual memory ($F_{GVM}$) as a percentage of the total GVM and compares (step 330) it with the allowed (from hypervisor's perspective) minimum value $T_{GVM}$. One option to compute the minimum free guest virtual memory for the guest $OS_i$ is to use the following formula:

$$T_{GVM}(i)=r_i \cdot T_{HPM} \cdot M_{HPM}/M_{GVM}, \text{ where } r_i=M_{GVM}(i)/\Sigma_j M_{GVM}(j),$$

which is the ratio of the guest virtual memory to the sum of virtual memories of all guest OSs. Therefore, in the example $T_{GVM}=(\frac{1}{2}) \cdot 10\% \cdot 2$ GB·/1.5 GB=6.7%. If $F_{GVM}>T_{GVM}$, no hypervisor swap of memory pages of that guest OS will be initiated. Otherwise, the hypervisor will start swapping memory pages of the guest OS by the appropriate technique pertinent to the guest OS. Assume only one guest OS has $F_{gvm}<T_{gvm}$. For example for LINUX with Kernel 2.6.x the hypervisor will instruct a pseudo-driver to increase a swapping parameter (swappiness). This can be done, for example, simply by echoing a value 'X' (from 0 to 100) onto /proc/sys/vm/swappiness, where 'X' has to be higher than the current swappiness value Y. The guest OS with increased swappiness will free up memory faster, and once the desired level of $F_{HPM}$ is reached, the previous swappiness parameter value can be reinstated.

In an example when both OSs have their $F_{gvm}<T_{gvm}$ then a different procedure may be required. The hypervisor will compare active usage of each page among all guest OSs where free or available GVM falls below the corresponding $T_{gvm}$, and the least active ones will be swapped. Various system active usages of memory pages are measured differently. For example, for OS1 there may be a page size of 4 KB, while for OS2 the page size is 8 KB. All other parameters may be equal, if both pages have been accessed by their respective applications the same number of times (Q) in the last measurement time period, the memory held up by the second page may be released or freed. That is, because if number of page access events are normalized (aka touches), then there will be Q/4 touches per KB for the page from OS1 and Q/8 touches per KB for the page in OS2. Therefore, this example method normalizes the number of touches (Tp) for each page P of size Sp which results in Tpn=Tp/Sp. Then all the pages are ordered in an increasing order with respect to Tpn, and pages below a predefined threshold Tc are swapped.

Referring back to FIG. 4, note that OS1 420 is shown with four pages of size 4 KB 422 and OS2 430 with 3 pages of size 8 KB 432. The corresponding 'touches' are shown below each page. Once a hypervisor receives all the necessary information via private channels between VMC drivers and the VPS, then we can list the seven pages in increasing normalized touches per KB metric. Pages with the lowest normalized touch metrics are removed from the memory. In the example of FIG. 7, the table 700 includes a threshold value $T_c=0.7$ which is used and all the pages with Tnp<Tc are released or freed. These pages are illustrated in FIG. 7. The Oss are identified 740 and the page address 720 and PID 730 are used to identify the page memory location and the number of touches 710 per page.

Figure 6:
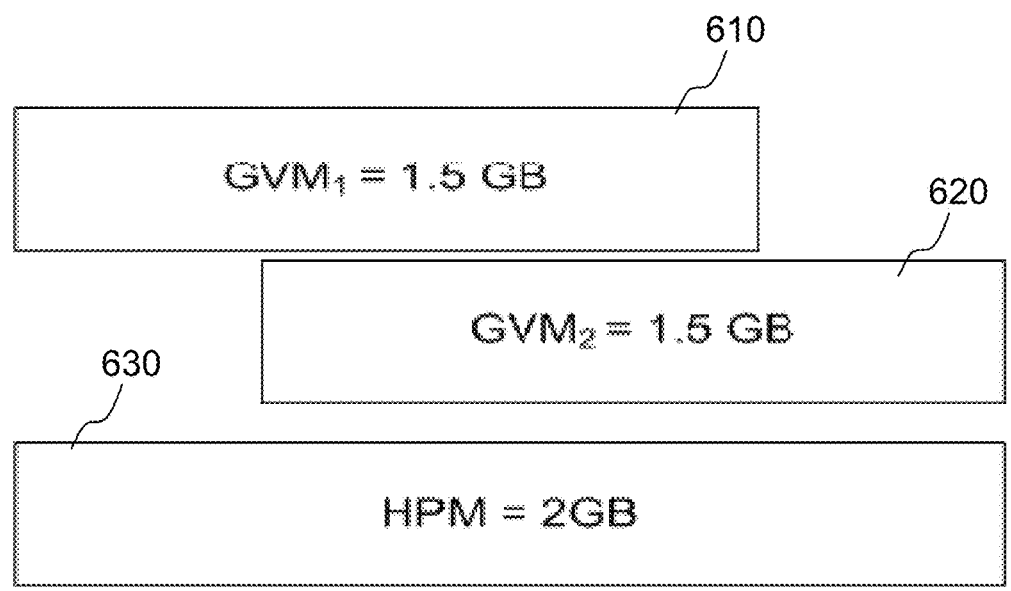
FIG. 6 is an illustration of 2 GB of host physical memory over provisioned between two guest OSs each having 1.5 GB of guest virtual memory.

Referring to FIG. 6, the pages 600 include a first 1.5 GB page size 610 and a second 1.5 GB page size 620. The HPM value is currently 630. The HPM value 630 may be used to accommodate the needs of both Oss even the total memory (3 GB) needed exceeds 2 GB. Alternatively, pages can be freed until the desired level of free HPM is not reached. Therefore, in another example, the allocation may provide while $F_{HPM}<T_{HPM}$, free the page with the lowest Tnp in the list generated in operation 350 and remove that page from the list. Presented methods provide relatively simple and fast options to balance the host physical memory at the hypervisor level in virtual systems with over provisioned memory. Illustrative examples can be easily generalized for more than two guest OSs and the presented formulas are applicable in a general case.

Figure 8:
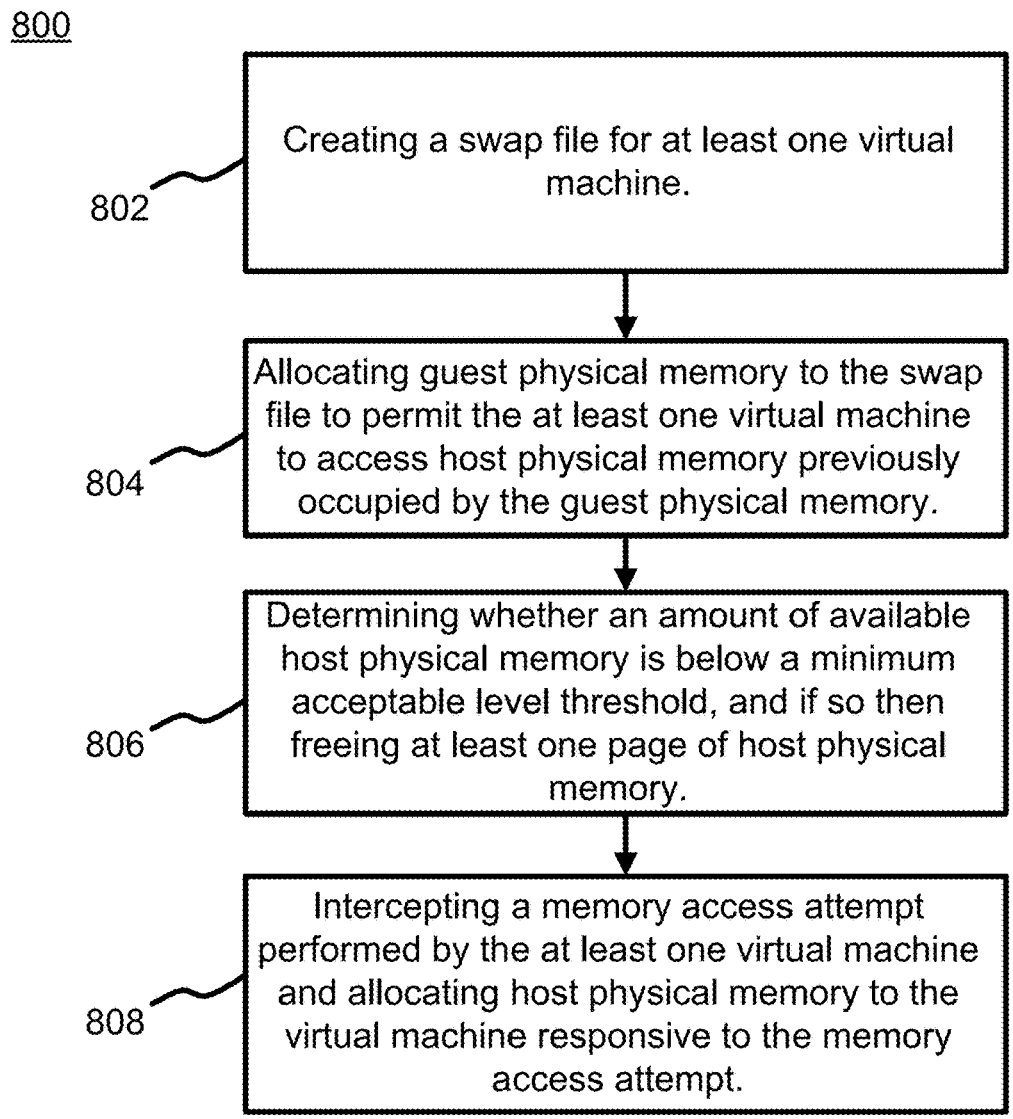
FIG. 8 is an example flow diagram of an example method of operation according to example embodiments.

FIG. 8 illustrates an example flow diagram 800 that provides creating a swap file for at least one virtual machine at operation 802. The example also provides allocating guest physical memory to the swap file to permit the at least one virtual machine to access host physical memory previously occupied by the guest physical memory at operation 804 and determining whether an amount of available host physical memory is below a minimum acceptable level threshold, and if so then freeing at least one page of host physical memory at operation 806. The method may also include intercepting a memory access attempt performed by the at least one virtual machine and allocating host physical memory to the virtual machine responsive to the memory access attempt at operation 808.

Figure 9:
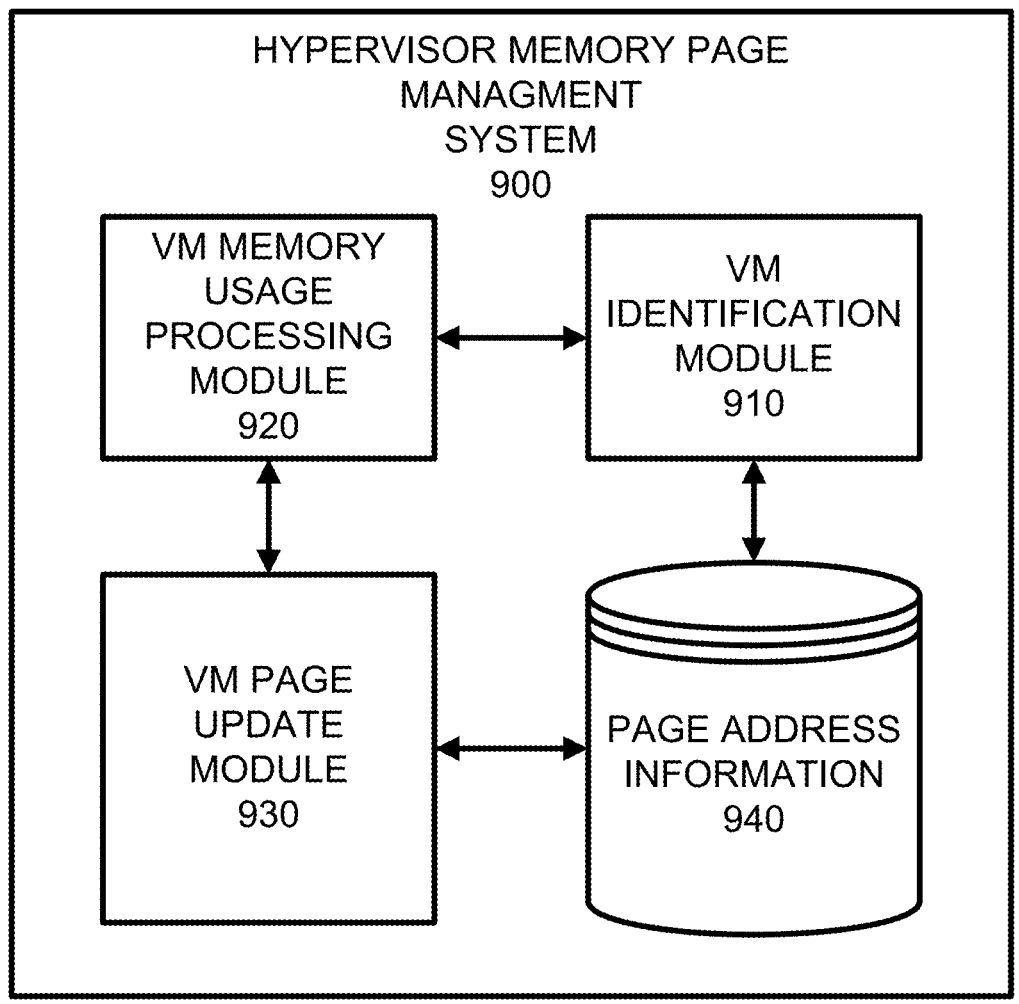
FIG. 9 is an example system configured to perform various operations in accordance with the example embodiments.

FIG. 9 illustrates an example system configuration. Referring to FIG. 9, the hypervisor memory page management system 900 includes a VM identification module 910 that may create a swap file for at least one virtual machine. The VM identification module 910 may also allocate guest physical memory to the swap file to permit one or more virtual machines to access host physical memory previously occupied by the guest physical memory. The swap file and page information may be stored in memory via a page address information database 940. The VM usage processing module 920 may perform determining whether an amount of available host physical memory is below a minimum acceptable level threshold, and if so then freeing at least one page of host physical memory. Changes to the guest physical memory, the host physical memory and other types of memory may be updated via the VM page updated module 930. The update module 930 may also perform intercepting a memory access attempt performed by the at least one virtual machine and allocating host physical memory to the virtual machine responsive to the memory access attempt.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 10 illustrates an example network element 1000, which may represent any of the above-described network components, etc.

Figure 10:
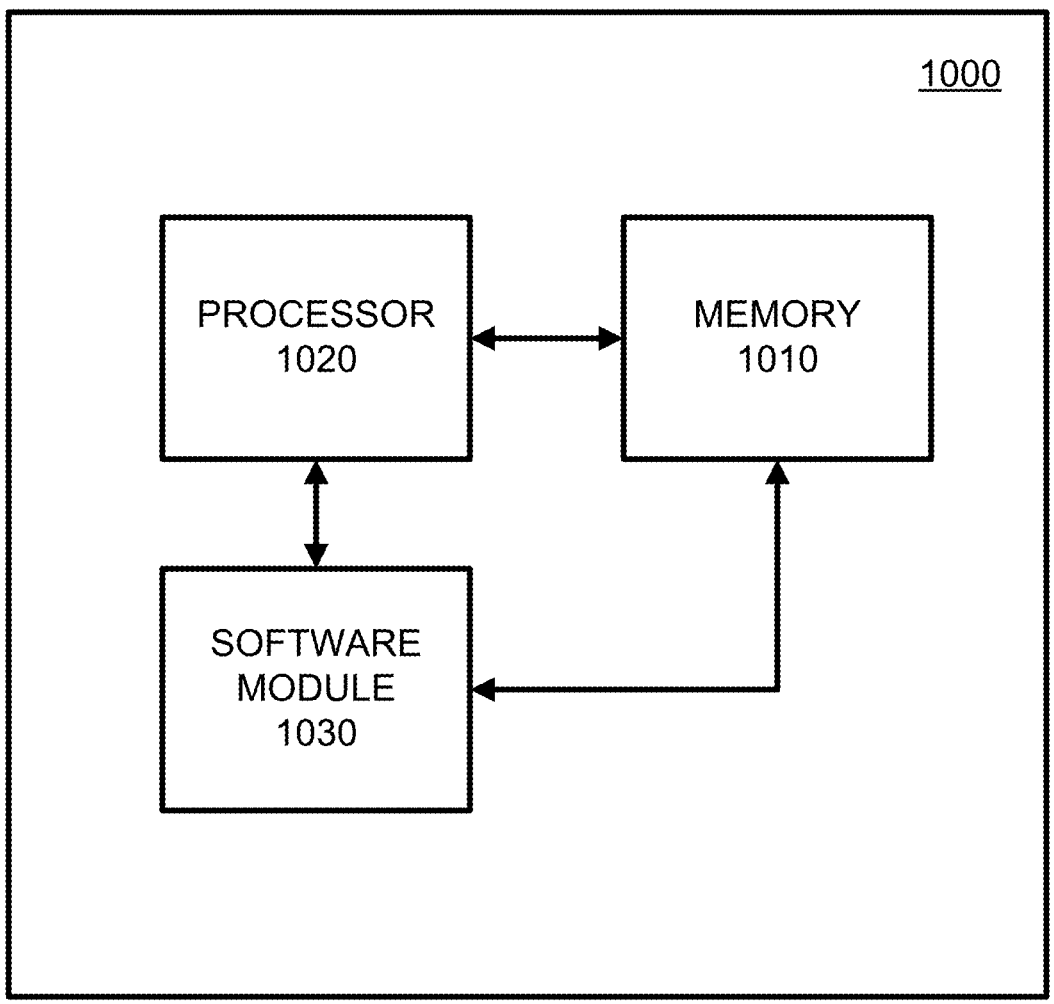
FIG. 10 is an example network entity and computing platform to perform one or more functions associated with the example embodiments.

As illustrated in FIG. 10, a memory 1010 and a processor 1020 may be discrete components of the network entity 1000 that are used to execute an application or set of operations. The application may be coded in software in a computer language understood by the processor 1020, and stored in a computer readable medium, such as, the memory 1010. The computer readable medium may be a non-transitory computer readable medium that includes tangible hardware components in addition to software stored in memory. Furthermore, a software module 1030 may be another discrete entity that is part of the network entity 1000, and which contains software instructions that may be executed by the processor 1020. In addition to the above noted components of the network entity 1000, the network entity 1000 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 9 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

We claim:

1. A method comprising:
    creating, via a processor, a swap file for at least one virtual machine;
    allocating guest physical memory to the swap file to permit the at least one virtual machine to access host physical memory previously occupied by the guest physical memory;
    determining whether an amount of available host physical memory for a client operating system is below a minimum acceptable level threshold, and if so then freeing at least one page of host physical memory;
    retrieving available guest virtual memory levels for each client operating system of a plurality of client operating systems;
    identifying whether any of the plurality of client operating systems' current guest virtual memory levels have fallen below an acceptable predefined threshold;
    when at least one of the plurality of client operating systems' current guest virtual memory levels has fallen below the acceptable predefined threshold, then identifying at least one page of guest virtual memory from at least one client operating system that is not operating below the acceptable predefined threshold and that is identified as being least active;
    swapping the at least one page of guest virtual memory from the at least one client operating system that is not operating below the acceptable predefined threshold and that is least active and allocating the at least one page of guest virtual memory to the client operating system that has fallen below the acceptable predefined threshold; and
    intercepting a memory access attempt performed by the at least one virtual machine and allocating host physical memory to the at least one virtual machine responsive to a memory access attempt by the at least one virtual machine.

2. The method of claim 1, wherein if the amount of free host physical memory is not below the minimum acceptable level threshold then periodically re-determining whether the amount of free host physical memory is below the minimum acceptable level threshold.

3. The method of claim 1, wherein the at least one virtual machine comprises a plurality of virtual machines.

4. The method of claim 3, wherein the plurality of client operating systems are different operating systems having different default memory page sizes.

5. The method of claim 1, wherein the allocating of guest physical memory is performed by a hypervisor managing a plurality of virtual machines.

6. An apparatus comprising:
    a processor configured to
        create a swap file for at least one virtual machine;
            allocate guest physical memory to the swap file to permit the at least one virtual machine to access host physical memory previously occupied by the guest physical memory,
            determine whether an amount of available host physical memory is below a minimum acceptable level threshold, and if so then freeing at least one page of host physical memory,
        retrieve available guest virtual memory levels for each client operating system of a plurality of client operating systems,
        identify whether any of the plurality of client operating systems' current guest virtual memory levels have fallen below an acceptable predefined threshold,
        when at least one of the plurality of client operating systems' current guest virtual memory levels has fallen below the acceptable predefined threshold, then identify at least one page of guest virtual memory from at least one client operating system that is not operating below the acceptable predefined threshold at that is identified as being least active;
        swap the at least one page of guest virtual memory from the at least one client operating system that is not operating below the acceptable predefined threshold and that is least active and allocate the at least one page of guest virtual memory to the client operating system that has fallen below the acceptable predefined threshold, and
        intercept a memory access attempt performed by the at least one virtual machine and allocate host physical memory to the at least one virtual machine responsive to a memory access attempt by the at least one virtual machine; and
    a memory configured to be allocated to provide the guest physical memory and the host physical memory.

7. The apparatus of claim 6, wherein if the amount of free host physical memory is not below the minimum acceptable level threshold then the processor periodically re-determines whether the amount of free host physical memory is below the minimum acceptable level threshold.

8. The apparatus of claim 6, wherein the at least one virtual machine comprises a plurality of virtual machines.

9. The apparatus of claim 6, wherein the plurality of client operating systems are different operating systems having different default memory page sizes.

10. The apparatus of claim 6, wherein the allocation of guest physical memory is performed by a hypervisor managing a plurality of virtual machines.

11. A non-transitory computer readable storage medium configured to store instructions that when executed cause a processor to perform:
creating, via a processor, a swap file for at least one virtual machine;
allocating guest physical memory to the swap file to permit the at least one virtual machine to access host physical memory previously occupied by the guest physical memory;
determining whether an amount of available host physical memory for a client operating system is below a minimum acceptable level threshold, and if so then freeing at least one page of host physical memory;
retrieving available guest virtual memory levels for each client operating system of a plurality of client operating systems;
identifying whether any of the plurality of client operating systems' current guest virtual memory levels have fallen below an acceptable predefined threshold;
when at least one of the plurality of client operating systems' current guest virtual memory levels has fallen below the acceptable predefined threshold, then identifying at least one page of guest virtual memory from at least one client operating system that is not operating below the acceptable predefined threshold and that is identified as being least active;
swapping the at least one page of guest virtual memory from the at least one client operating system that is not operating below the acceptable predefined threshold and that is least active and allocating the at least one page of guest virtual memory to the client operating system that has fallen below the acceptable predefined threshold; and
intercepting a memory access attempt performed by the at least one virtual machine and allocating host physical memory to the at least one virtual machine responsive to a memory access attempt by the at least one virtual machine.

12. The non-transitory computer readable storage medium of claim 11, wherein if the amount of free host physical memory is not below the minimum acceptable level threshold then periodically re-determining whether the amount of free host physical memory is below the minimum acceptable level threshold.

13. The non-transitory computer readable storage medium of claim 11, wherein the at least one virtual machine comprises a plurality of virtual machines.

14. The non-transitory computer readable storage medium of claim 11, wherein the plurality of client operating systems are different operating systems having different default page sizes and the allocating of guest physical memory is performed by a hypervisor managing a plurality of virtual machines.

\* \* \* \* \*